United States Patent
MacLeod

[11] 3,885,550
[45] May 27, 1975

[54] METHOD AND DEVICE FOR DIFFERENTIAL OLFACTOMETRY

[75] Inventor: Patrick MacLeod, Chatenay Malabry, France

[73] Assignee: Commissariat a l'Energie Atomique, Paris, France

[22] Filed: Nov. 30, 1973

[21] Appl. No.: 420,613

[30] Foreign Application Priority Data
Dec. 8, 1972  France ............... 72.43805

[52] U.S. Cl. .............................................. 128/2 R
[51] Int. Cl. ................................................ A61b 5/00
[58] Field of Search ......... 128/2 C, 2 R, 198, 200, 128/206, 207

[56] References Cited
UNITED STATES PATENTS
| | | | |
|---|---|---|---|
| 1,139,357 | 5/1915 | Garske | 128/198 |
| 1,155,608 | 10/1915 | Nieschang | 128/198 |

FOREIGN PATENTS OR APPLICATIONS
| | | | |
|---|---|---|---|
| 346,325 | 11/1904 | France | 128/198 |
| 522,524 | 3/1956 | Canada | 128/198 |

*Primary Examiner*—Kyle L. Howell
*Attorney, Agent, or Firm*—Lane, Aitken, Dunner & Ziems

[57] ABSTRACT

By means of a manually operated electronic control unit, a standard olfactory stimulus and an olfactory stimulus to be measured are each applied respectively and simultaneously to one nostril of an experimenter's nose through two odor injectors with nozzles mounted on a nose-centering support, the nozzles being controlled by a respiration detection device and cut-off during the intervals between stimulation periods by means of a retractable anti-diffusion device. The respective odor intensities of the stimuli are compared by means of the strongest sensation perceived within one nostril and the intensities are equalized by adjusting the amplitude of the stimulus to be measured with respect to the standard stimulus.

14 Claims, 4 Drawing Figures

METHOD AND DEVICE FOR DIFFERENTIAL OLFACTOMETRY

This invention relates to physiological-zero detectors for measuring odor intensities of distinct olfactory stimuli.

It is known that the object of olfactometry is to deliver an olfactory stimulus which is well defined both in chemical composition and in concentration. This measurement technique calls for devices which are capable of diluting, in a ratio which may exceed one million, one or a number of odorous gases in an odorless gas which in most instances is either air or nitrogen.

From the user's point of view, olfactometry meets two requirements, namely the measurement of the olfactive threshold (liminal olfactometry) or the measurement of intensities of odors (supraliminal olfactometry). The experimental method is simple when it is intended to measure a threshold and accordingly consists in determining the lowest concentration which an individual is capable of perceiving with a probability of 50 percent.

In the case of supraliminal olfactometry, two methods are open to selection, namely either subjective estimation of the intensity as expressed by a numeral between O and a maximum value or equalization between the experimental stimulus and a standard stimulus which is suitably selected from a range of intensity, said equalization being carried out by successive approximations.

From the manufacturer's point of view, two problems are to be solved, namely the mode of dilution and the mode of presentation of the stimulus. The dilution can be either static or dynamic whilst the presentation of the stimulus can be active, by inhalation (or sniffing) or passive, by injection into the nasal fossae of the person being studied. Static dilution is obtained by introducing a known quantity of odorous substance in a known volume of odorless gas contained in an inert enclosure. Dynamic dilution is obtained by mixing a weak odorous gas stream with a strong odorless gas stream; by increasing the number of dilution stages, any concentration can thus be obtained.

Experience has shown that the best results are obtained by using dynamic olfactometers with active presentation of the stimulus. So far as the supraliminal field is more particularly concerned, the method which provides the most accurate and reproducible results is the equalization method.

Even when postulating the optimum conditions which have just been defined, olfactometric measurements suffer from the following disadvantages:

the devices are heavy, cumbersome, delicate and difficult to handle whilst portable appliances are lacking in accuracy;

measurements of intensity are limited in their accuracy by a known physiological fact: the smallest difference in perceptible intensity corresponds to an increase in concentration of 50 percent (or to a reduction of 33 percent);

reproducible figures are obtained only by repeating the measurements several times on a number of different individuals so as to obtain mean values which exclude interindividual variations as well as intraindividual variations. It is consequently impossible to measure with certainty the odor intensity of a given stimulus perceived by a given person at a given instant.

The aim of the invention is to overcome the drawbacks which have just been mentioned by deriving advantages from the physiological data which have been recalled in the foregoing.

Both in man and in all animals endowed with paired olfactory organs, the sensations received by the olfactory mucous membrane on one side are transmitted to the olfactory bulb on the same side. The two olfactory bulbs are connected to each other by a nerve system which establishes a mutual inhibition between them: as one olfactory bulb is more highly activated, so it slows down the response of the other. Said mutual inhibition attains a maximum when the two stimuli are perfectly synchronous to within one millisecond. This produces between the two olfactory bulbs a state of unstable equilibrium which magnifies the differences with greater effectiveness as these latter are smaller. The equality in intensity of the two stimuli can therefore be determined with a high degree of accuracy and the two bulbs considered together accordingly behave in the same manner as a high-gain zero detector.

A further aim of the invention consists in employing said physiological zero detector for measuring the equality of odor intensities of two distinct olfactory stimuli which are each presented simultaneously on one side of the nose of the same person.

To this end, the invention proposes a method which is distinguished by the fact that:

two olfactory stimuli consisting of a standard stimulus and a stimulus to be measured are each presented respectively and simultaneously at one nostril of the nose of one and the same experimenter by means of an electronic control system triggered by the experimenter, the respective intensities of said stimuli are compared by means of the strongest sensation perceived within one nostril, the intensities within each nostril are equalized by adjusting the amplitude of the stimulus to be measured with respect to the standard stimulus.

The two stimuli must on the one hand be strictly synchronous and on the other hand be separately adjustable for amplitude. Moreover, in order to eliminate any distortions which may be introduced as a result of asymmetry of the nasal fossae or cavities, it is necessary to proceed as for a double weighing operation: it is postulated by way of exampel that E is a standard stimulus and X is a stimulus having an amplitude which it is desired to adjust in order to ensure that its intensity is equal to that of E; said stimulus E is first presented on the right-hand side and is equalized with an auxiliary stimulus R which is presented on the left-hand side and performs the function of a tare; without modifying R, the stimulus X is presented on the right-hand side and equalized with R. It can then be stated that E and X have the same odor intensity.

Equality of sensations can be determined electro-physiologically in the case of animals or subjectively in the case of human being. In the first case, the signals collected by electrodes judiciously placed in the two olfactory bulbs are utilized. In the second case, recourse is had to verbal expression in order to indicate the side on which the strongest sensation is perceived. It is said that the compared intensities are equal when the sensation perceived is either "at the center" or "not stronger on one side than on the other".

A further aim of the present invention is to provide a differential olfactometer which carries out the method hereinabove defined and which essentially comprises:

two odor injectors with nozzles mounted on a nose-centering support, a retractable anti-diffusion device for cutting-off the nozzles during the periods of stimulation, an electronic control unit and a respiration detection device for controlling the nozzles.

Each injector is provided at the end nearest the centering support with a nozzle of suitable diameter and orientation; the two injectors are placed in such a manner as to ensure that each nozzle is located opposite to the center of one of the experimenter's nostrils. The nozzles are designed in the form of end-caps which are each pierced by a calibrated orifice.

The person performing the experiment maintains a constant position by ensuring that his nasal septum bears directly on a horizontal support or preferably on a dental plaster-cast.

The injector proper is made up of three components, namely the deformable reservoir, the motor and the nozzle.

The deformable reservoir is a bottle-shaped stainless steel container having a capacity of approximately 200 ml. The base of said container is capable of moving axially over a distance of a few millimeters by virtue of a thin and resilient section, either on the end-wall (corrugated diaphragm) or on the cylindrical wall (bellows element). The odorous charge is constituted by a few grams of liquid or solid odorous substances which may be diluted in an odorless solvent if necessary. The internal atmosphere of the reservoir is in saturation equilibrium with the liquid or solid phase and therefore has a constant composition. In the case of a gaseous odorous substance, the reservoir is fitted with a gas circulation system (for example of an inlet nozzle and an outlet nozzle in diametrically opposite relation) for maintaining a constant internal atmosphere within said reservoir.

The motor is an electromagnetic device having reciprocating linear movements and low inertia, of the loudspeaker moving-coil type. Coupling of the motor to the reservoir can be mechanical, hydraulic, pneumatic or even magnetic. The design of said coupling must be such as to facilitate rapid exchange of the reservoir-nozzle assembly whilst the motor remains stationary.

The differential olfactometer in accordance with the invention is to put into operation in compliance with the requirements of the physiological laws recalled earlier by making use of a anti-diffusion device formed by a retractable hollow end-piece which fits tightly over the external orifice of each nozzle and is subjected to continuous aspiration at a flow rate of the order of 2 ml/minute. In order to synchronize the operation of the anti-diffusion device mounted on each end-piece with the inspirations of the experimenter, the electronic control unit comprises a circuit for shaping the variations in potential of the detection device so as to generate a pulse of short duration which coincides with the beginning of an inspiration, a circuit for controlling the anti-diffusion device, a first flip-flop for delaying the signal produced by said short pulse, two further flip-flops assigned respectively to two amplifiers so as to obtain rectangular current pulses which are independently adjustable in duration and in intensity, said rectangular pulses being applied to the motors of the injectors, a manual control system for simultaneously closing said flip-flops.

The description which follows below will serve to gain a clearer understanding of the invention and relates to a method of differential olfactometry which is given by way of non-limitative example, to the olfactometer which results from the application of said method and to exemplified embodiments which are described with reference to the accompanying drawings, wherein.

Figure 1:
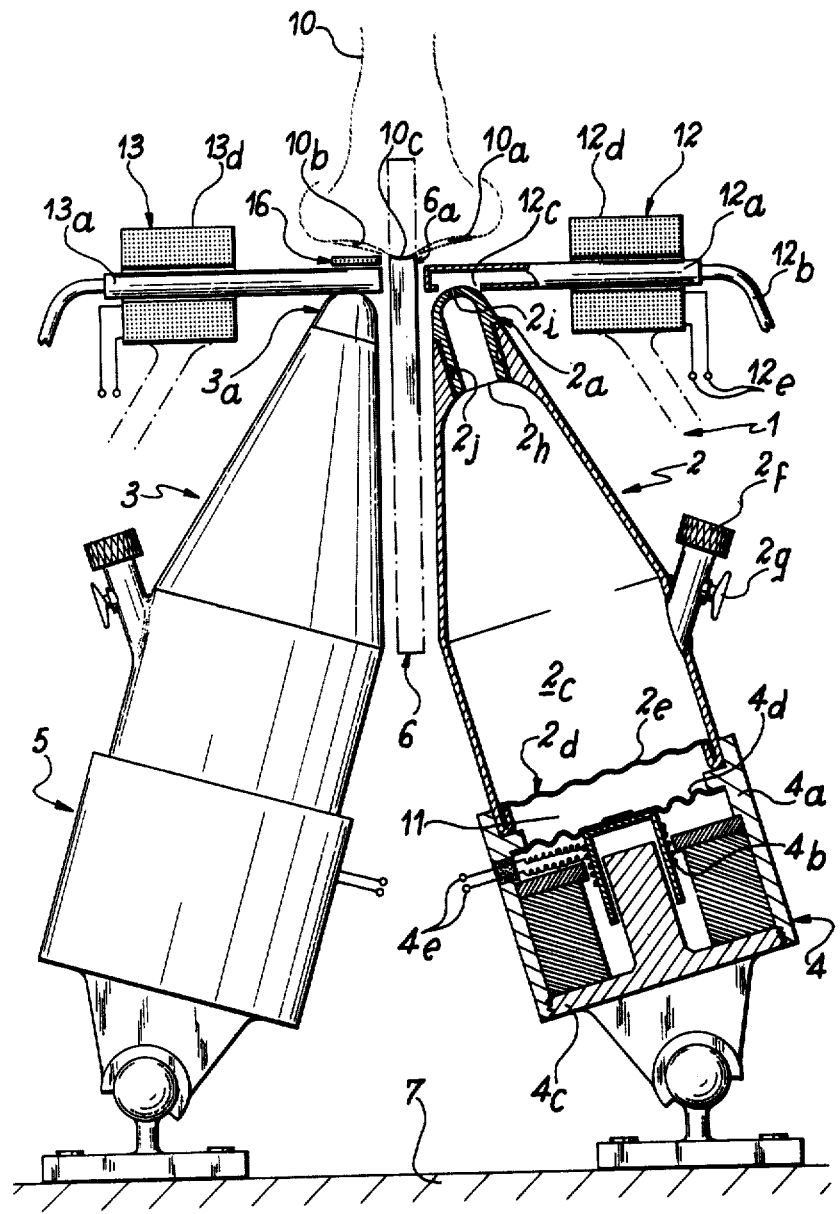
FIG. 1 is a diagrammatic view of the mechanical assembly of the differential olfactometer in accordance with the invention.

In FIG. 1, the reference numeral 1 designates the mechanical assembly of the differential olfactometer. Said assembly comprises in particular two injectors 2 and 3 which terminate at one end in nozzles designated respectively by the references 2a, 3a. The injectors 2 and 3 are coupled at the other end to motors 4 aand 5. The assembly 1 comprises a so-called nose-centering bracket 6 which is mounted on a table 7 by means of an orientable system 8. The system just mentioned and the support bracket 6 serve to locate and to orient the nozzles 2a, 3a in the axis of the nostrils 10a, 10b of the nose 10 of the experimenter.

Each injector such as the injector 2 is formed by a reservoir or bottle-shaped container 2c which is preferably of stainless steel and has a capacity of approximately 200 ml, the bottom wall 2d of the reservoir 2c being so designed as to be capable of axial displacement over a distance of a few millimeters. Said bottom wall is provided in the form of a diaphragm 2e having concentric corrugations. In another example of construction (not shown in the drawings), the movable bottom wall is connected to the reservoir by means of a bellows element. It will be noted that a lateral inlet connection 2f and a valve 2g serve to establish a communication between each injector 2 (or 3) and an external gas circulation system (not shown in the drawings). In this case, the discharge of gas through the nozzle 2a serves to maintain a constant internal atmosphere within the reservoir 2c.

The nozzles such as the nozzle 2a are formed by an end-cap 2h which is preferably of stainless steel and pierced by a calibrated orifice 2i. Said nozzles are of conventional design with details (not illustrated) permitting adjustment and reading on external reference marks. Leak-tightness of the end-cap 2h with respect to the neck of the bottle-shaped container 2 is ensured by means of an O-ring seal 2j in the example under consideration. It would also be possible to employ an end-cap or stopper having a conical ground joint or any other known means for rapid demounting of the nozzles.

Each injector 2 or 3 is joined at the end adjacent to the movable bottom wall 2d to the frame 4a of an electromagnetic motor which is designated by the reference 4 and is of a type known per se. Said motor is similar to those employed in loudspeakers and comprises a coil 4b (input leads 4e) which moves within a magnetic yoke 4c; the coil 4b is attached to a diaphragm 4d.

A space 11 is formed between the injector 2 and the motor 4 with a view to housing within this latter a system (not shown) for the transmission of motion between the diaphragms 2e and 4d. This transmission system also permits demounting between an injector 2 and a motor 4 (or an injector 3 and a motor 5) and a number of different design solutions may accordingly be employed for this purpose, e.g., a system of the mechanical type with a connecting-rod or of the magnetic type with permanent magnets, such systems being mentioned without implying any limitation of the scope of the invention.

The nozzles 2a, 3a are each surmounted respectively by anti-diffusion devices 12 and 13 having the intended function of preventing the odorous molecules which diffuse from the nozzles from being detected by the nose 10 of the experimenter outside periods of stimulation. Each device such as the device 12 is formed by a thin-walled tube 12a which is closed at one end (namely the end nearest the nozzle) and terminates at the other end in an inspiration inlet tube 12b. A lateral opening 12c formed in the tube 12a near the closed end is placed opposite to and at a very short distance from the calibrated orifice 2i of the nozzle 2a. The tube 12a is placed within a coil 12d (input leads 12e) and is capable of operating in the same manner as a magnetic plunger or magnetic armature within the coil 12d which is energized by an electric current. When the tube 12a is actuated by the coil 12d, it uncovers the orifice 2i of the nozzle 2a and permits free inspiration of the odorous molecules.

Figure 2:
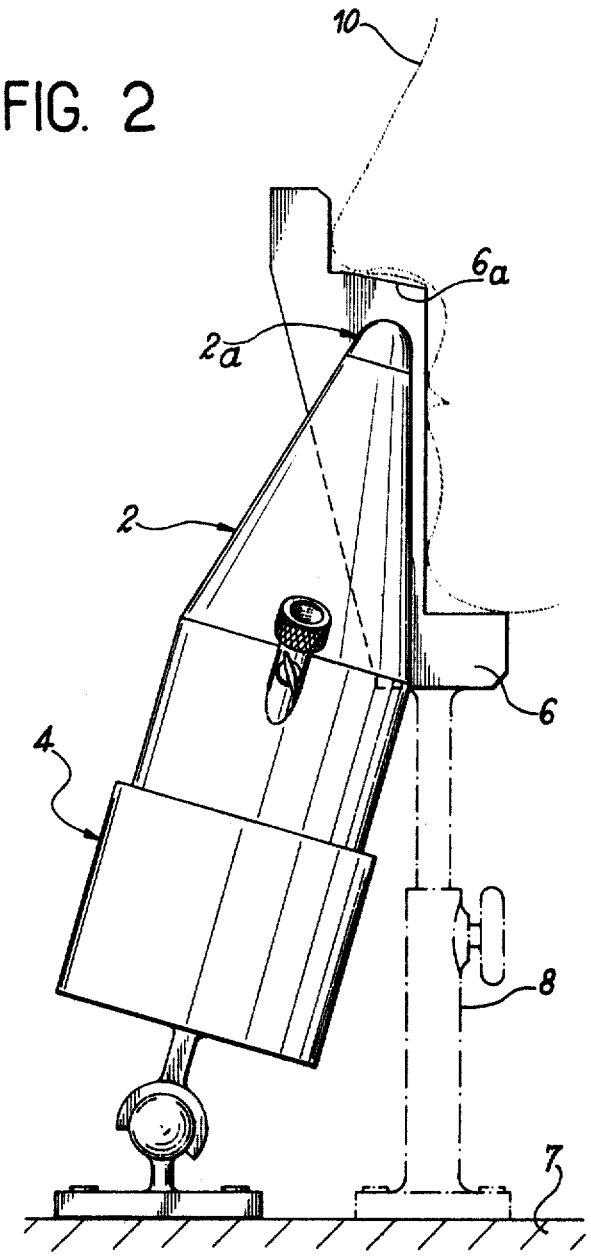
FIG. 2 illustrates the installation of the olfactometer during utilization of this latter.

The assembly of the coils such as 12d, the orientation of the nozzles 2a, 3a and especially the positioning of the experimenter's nose 10 are carried out by means of the centering bracket 6 as shown diagrammatically in FIGS. 1 and 2.

In practice, the experimenter places his nasal septum 10c or partition between the two nasal cavities on the supporting ledge 6a of the bracket 6, then orients the injectors 2 and 3 in such manner as to center the nozzles 2a, 3a in the axis of his nostrils 10a, 10b and adjusts the coils 12d, 13d and the tubes 12a, 13a accordingly. In another example of construction which is not shown in the drawings, it has been proposed to combine the centering bracket with a dental plaster-cast with a view to enhancing the accuracy of positioning of the nozzles.

As had been explained earlier, provision is made in the method according to the invention for the use of a human physiological detector in order to measure the equality of odor intensities of two distinct olfactory stimuli which are presented simultaneously at each nostril of the nose of the same person. The two stimuli must therefore be strictly synchronous and presented at the very short instants during which the inspiration passes through a maximum value.

Figure 3:
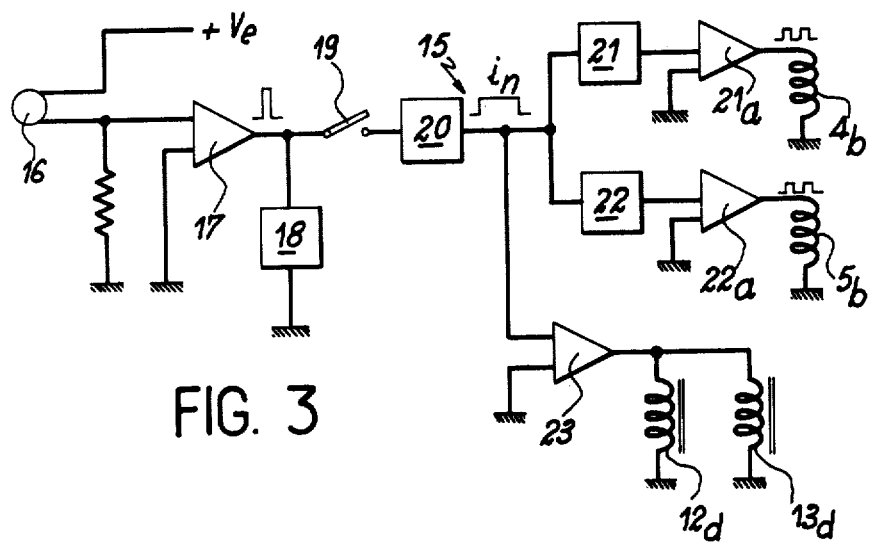
FIG. 3 is a schematic diagram showing the electronic control system of the olfactometer.

Sychronism of the stimuli can be obtained by means of an electronic control unit 15 which is connected to the injectors 2 and 3 as shown in the schematic diagram of FIG. 3. Said control unit 15 comprises a thermistor 16 inserted in one arm of a measuring bridge which is incorporated in a shaping circuit 17. The thermistor 16 represents the respiration detection device and is placed between one nostril such as the nostril 10b, for example, and the tube 13a (as shown in FIG. 1).

Figure 4:
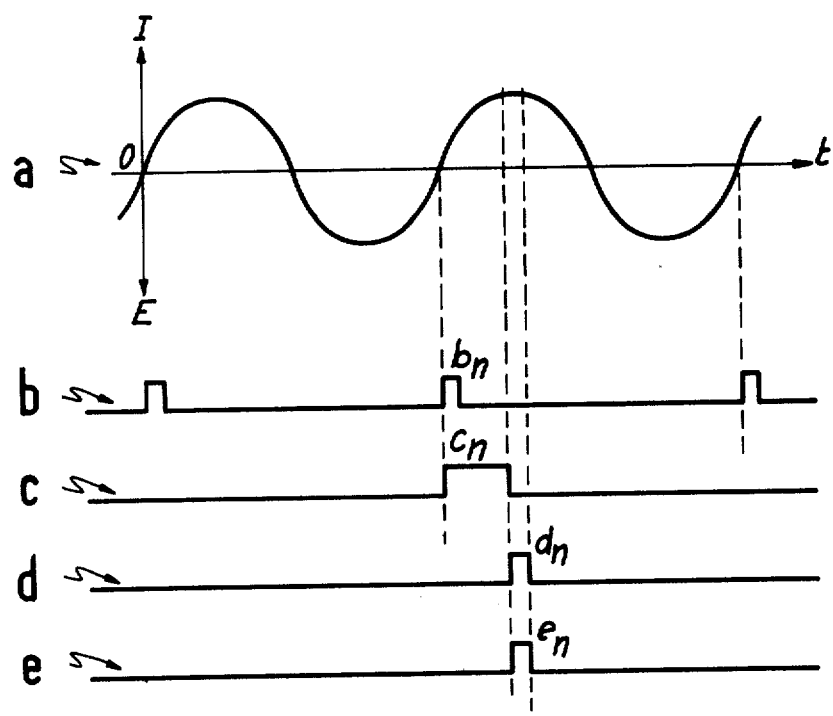
FIG. 4 illustrates operating chronograms.

The shaping circuit 17 receives the variation of the signal emitted by the thermistor 16 as a function of the inspirations and expirations (diagram $a$ in FIG. 4) and emits short pulses $b_n$ (diagram $b$ in FIG. 4) which correspond to the beginning of each inspiration.

A time-signal generator 18 triggered by said short pulse is intended to supply information to the experimenter and/or his assistants in regard to the performance of the method by means of a light or sound signal.

The experimenter is able to initiate the measuring process at his convenience by operating a switch 19 while being guided by the time signals. When the switch 19 is closed, the beginning of the inspiration initiates delivery of the short pulse $b_n$ which is applied to a first flip-flop 20, thereby introducing a time-delay $c_n$ of 100 ms, for example (diagram $c$, FIG. 4). This time interval corresponds to the maximum increase in amplitude of an inspiration.

After the time interval $c_n$ has elapsed, the flip-flop 20 changes state and sets simultaneously two further flip-flops 21 and 22 which deliver synchronized rectangular pulses via amplifiers 21a and 22a to the coils 4b and 5b of the corresponding motors. The time $d_n$ of application of the rectangular pulses is fixed at 30 ms.

At the same time, an amplifier 23 which is controlled by the flip-flop 20 energizes the coils 12d and 13d of the anti-diffusion devices 12 and 13 during a time interval $e_n$ (diagram $e$, FIG. 4) which corresponds to the time of withdrawal of the tubes 12a and 13a (shown in FIG. 1).

The time intervals $c_n$, $d_n$ and $e_n$ can be modified according to the rate of breathing or so-called breathing rhythm of the experimenter.

The description of the mechanical components of the assembly 1 and of the electronic control unit 15 will serve to explain the operation of the differential olfactometer in accordance with the invention.

Before carrying out a measurement of olfactometric intensity, the reservoirs 2c of the injectors 2 and 3 are filled with a charge consisting of a few grams of liquid or solid odorous material which may be diluted if necessary in an odorless solvent. The internal atmosphere of the reservoir is in saturation equilibrium with the liquid or solid phase and its composition is therefore constant. In the case of a gaseous odorous substance, the inlet connection 2f of each reservoir is put into communication through the valve 2g with a gas circulation system. The reservoirs are usually filled with butanol which is chosen as a reference substance.

By way of example, the measurement is performed as follows:

the nozzle 2a of the first injector, for example the injector 2, is set at a standard value (E) which will remain unchanged throughout the measuring operation;

the nozzle 3a of the second injector 3 is then set at an identical calibration value (R);

the experimenter rests his chin on the bracket 6 and places the central partition or septum of his nose 10 on the supporting ledge 6a. On each inspiration (as shown by the diagrams $a$, $b$, in FIG. 4), the respiration detection device, namely the thermistor 16 in this instance, triggers a sound or light signal by means of the time-signal generator 18;

the experimenter holds his breath, then actuates the switch 19 and breathes in deeply (sniffing action). The short pulse of the shaping circuit 17 sets the flip-flop 20 and, after a time interval of 100 ms (taken as an example), said flip-flop changes state so as to set the flip-flops 21 and 22 which operate the amplifiers 21a and 22a, thereby producing the rectangular pulses which are applied to the windings 4b (5b) of the motors 4 and 5. At the same time, the amplifier 23 also delivers rectangular pulses and these latter are applied to the coils 12d and 13d which withdraw the tubes 12a, 13a of the anti-diffusion devices 12 and 13. Said rectangular pulses are applied at the moment when the amplitude of inspiration of the experimenter attains the highest value (I max, diagram a in FIG. 4). Said pulses are limited to 30 ms in the example under consideration;

the experimenter immediately states whether the olfactory sensation is predominant either on the left-hand or right-hand side, namely on the side corresponding to either the injector 2 or the injector 3. The setting of the nozzle 3a is accordingly re-adjusted.

It will be noted that the rectangular pulses applied to the motors 4 and 5 have the effect of causing the displacement of the diaphragms 4d and 2e (by means of the transmission system which has not been illustrated), thereby inducing stimulation in response to the discharge of odor through the nozzle 2a (3a in the case of the injector 3).

The experimenter performs a second test, a time interval of at least two minutes permitted to elapse between successive tests. When the odor is practically "at the center", that is to say equal in the case of each nostril, the setting of the nozzle 2a is noted and the injector 2 is replaced by a third injector (not shown in the figure) which contains the substance X to be measured. The injector 3 remains in position with a calibrated and unchanged nozzle setting (nozzle 3a).

The setting of the third injector (X) is readjusted until the moment when the experimenter states that the sensation does not predominate either on the left-hand side or on the right-hand side.

The stimuli delivered by the injector 3 (= R) and the injector X (which has taken the place of the injector 2) are then considered as being of equal intensity.

A method in accordance with the invention as hereinabove described is in fact equivalent to the so-called double-weighing technique.

The parameters which govern the volume of the stimulus at the outlet of the injector are: the caliber of the nozzle, the intensity of the rectangle-wave signals applied to the motor.

One alternative form (not shown) of the invention would make it possible to produce olfactory stimuli from odorous mixtures circulating within separate tubes which terminate at the nozzles instead of producing said mixtures within reservoirs. In this case, releases of stimuli would be controlled by electrovalves energized by an electronic control system which is similar to the control unit described in the foregoing.

The differential olfactometer in accordance with the invention finds original applications on the one hand by virtue of its ease of transportation and low capital cost and on the other hand by reason of the accuracy with which it serves to determine the intensity of a given stimulus in respect of well-defined experimental conditions.

The olfactometer has a potential application in the field of fundamental research both on animals and on human beings and can make supraliminal olfactometry much more readily accessible to investigators.

In industrial research, the present invention makes it possible to contemplate operations for checking and measuring intensities of odors at actual locations and thus avoiding the problem of sampling for subsequent analysis.

In medical practice, the invention can facilitate diagnoses by otorhinolaryngologists as well as appraisals performed by medical experts after accidents which result in certain deficiencies of the olfactory sensorial system.

What we claim is:

1. Method for measuring respective odor intensities of olfactory stimuli, comprising the steps of:
    a. presenting two olfactory stimuli simultaneously to the nose, one to each nostril, one of the stimuli comprising a standard stimulus and the other of the stimuli comprising a stimulus to be measured,
    b. comparing the respective intensities of the stimuli by determining which of the stimuli is the stronger as perceived within one of the nostrils,
    c. adjusting the amplitude of the stimulus to be measured relative to the amplitude of the standard stimulus until the intensities perceived in both nostrils are about equal, and
    d. determining the difference in amplitude between the standard stimulus and the stimulus to be measured when the intensities perceived in both nostrils are about equal.

2. The method of claim 1, and further including the steps of:
    a. equalizing the intensity of the standard stimulus as perceived in both nostrils by means of a calibration stimulus at the entrance of one of the nostrils before presenting the stimulus to be measured to said one of the nostrils, and
    b. presenting the stimulus to be measured to said one of the nostrils while the calibration stimulus remains constant.

3. A differential olfactometer for carrying out the method in claim 1, comprising:
    a. a nose-centering support,
    b. two stimulus injecting means mounted on the support, each injecting means including a nozzle adapted to inject a stimulus into a nostril,
    c. means for preventing the stimuli from being detected by the nose at selected time intervals, and
    d. means for controlling the injection of stimuli.

4. The device in claim 3, wherein each injecting means includes a reservoir connected to the nozzle, at least a portion of the reservoir being capable of being deformed, and the means for controlling the injection including means for deforming the reservoir in response to breathing rhythm.

5. The device in claim 3, wherein the means for preventing includes a hollow end piece that is capable of fitting over each nozzle, means for selectively moving the end piece over and away from the nozzle, and means for providing a suction in the end piece.

6. The device in claim 3, wherein the means for controlling further includes a respiration detection device, a circuit for shaping the variations in potential of the detection device so as to generate a pulse of short duration which coincides with the beginning of an inspiration, a circuit for controlling the means for preventing a first flip-flop for delaying the signal produced by said short pulse, two further flip-flops assigned respectively to two amplifiers so as to obtain rectangular current pulses which are independently adjustable in duration and in intensity, said rectangular pulses being applied to activate the injecting means, a manual control system for simultaneously closing said flip-flops.

7. The device in claim 3, wherein the means for controlling comprises a measuring bridge that includes a thermistor located in the vicinity of one of the nozzles.

8. The device in claim 3, wherein each nozzle is formed in an end-cap pierced by a calibrated orifice.

9. The device in claim 4, wherein each reservoir comprises a bottle-shaped container that includes a bottom wall capable of axial displacement.

10. The device in claim 4, wherein the means for controlling includes electromagnetic motors capable of performing reciprocating linear movements.

11. The device in claim 9, wherein the bottom wall includes a corrugated diaphram.

12. The device in claim 3, wherein at least one stimulus includes an odorous charge of liquid odorous material.

13. The device in claim 3, wherein at least one stimulus includes a solid odorous material.

14. The device in claim 4, wherein each reservoir includes means for circulating a gaseous odorous substance which serves to maintain a constant internal atmosphere.

* * * * *